May 16, 1961 J. A. WORCESTER 2,984,742

CIRCUIT FOR A TRANSISTOR CLASS A OUTPUT STAGE

Filed July 27, 1956

INVENTOR:
JOSEPH A. WORCESTER,

BY Laurence R. Kempton
HIS ATTORNEY.

2,984,742

CIRCUIT FOR A TRANSISTOR CLASS A OUTPUT STAGE

Joseph A. Worcester, Utica, N.Y., assignor to General Electric Company, a corporation of Delaware Filed July 27, 1956, Ser. No. 600,472

9 Claims. (Cl. 250—20)

Figure 1:
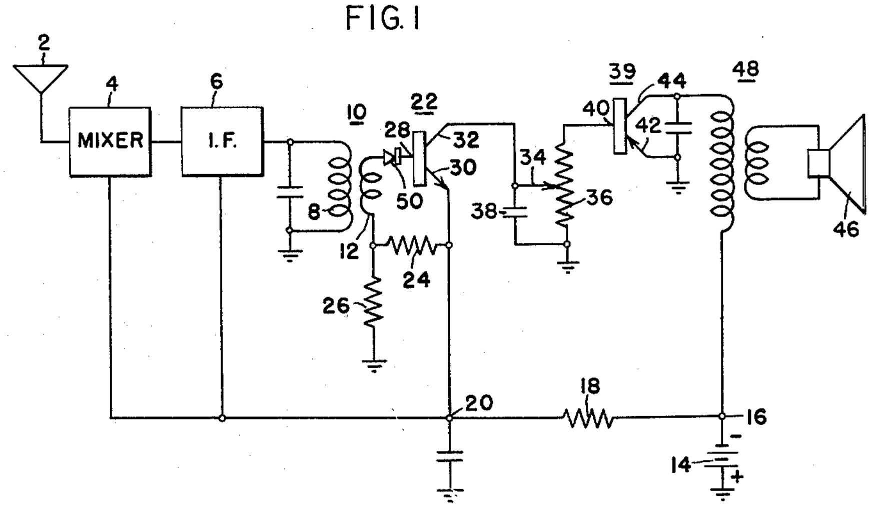

This invention relates to an improvement in signal translating stages usable in battery powered broadcast receivers or in other devices where it is desirable to conserve the source of electrical potential.

When transistors are utilized for the amplication of electrical signals, they are normally operated so that a minimum current flow from the source of electrical potential is established in one or more of the stages independently of the presence or absence of a signal or of the level of signal strength. That is to say the circuitry and biases on the electrodes are such that some current flows at all times. In those situations wherein the source of electrical potential for operation is limited, as when it is supplied from a battery, there is a dissipation of energy that serves no useful purpose.

Therefore, it is an object of this invention to provide a novel multi-stage circuit for amplifying unidirectional electrical signals in which there is substantially no current flow in at least one of the stages in the absence of a signal being amplified.

It is another object of this invention to provide a novel circuit for amplifying unidirectional electrical signals in which the current in at least one stage is proportional to the level of signal strength.

In prior battery-powered broadcast receivers, wherein transistors are utilized for one or all of the stages normally found in the receiver, the arrangement of the audio amplification stage is such that current is drawn from the battery, once the set is turned on, even though no signal may be received. Thus, in the area of a high signal strength, there is a current drain from the battery resulting in output, which if not desired, must be reduced in intensity by means of a volume control potentiometer and thereby partially wasted. Such a mode of operation, of course, shortens the life of the battery in the receiver and increases the cost of operating the unit.

Therefore, it is still another object of this invention to provide a novel broadcast receiver audio amplification circuit which functions in such a manner as to conserve the electrical potential stored in the battery.

It is a further object of my invention to provide a novel signal translating stage for broadcast receivers utilizing a pair of complementary transistors coupled so that the conduction of one transistor is determined by whether or not the other is conducting.

Briefly, the objects of this invention are achieved in one form by the provision of a pair of complementary transistors having a direct current connection between the collector of the first and the base of the second. The latter transistor is coupled to a battery power supply and is normally operated as a class A amplifier. The application of a signal to the input of the first transistor and conduction therein creates a bias on a suitable electrode in the second transistor to cause conduction therein. In this manner, conduction in the second transistor takes place only when a signal is received.

Features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which the figure is a schematic illustration of a receiver incorporating one embodiment of my invention.

Figure 2:
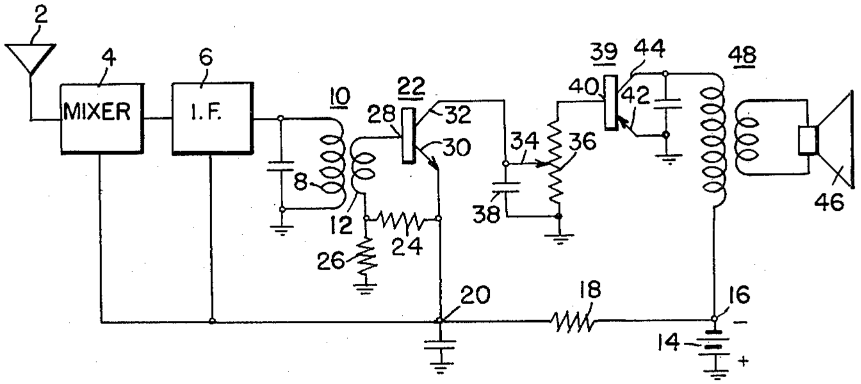

In the drawing, Fig. 1 illustrates an embodiment of my invention incorporated in a battery powered radio broadcast receiver of the superheterodyne variety, and Fig. 2 illustrates an alternative embodiment. The usual antenna 2 has its output coupled to a mixer stage 4. An intermediate frequency amplifier stage 6 receives the output of the mixer 4 in the manner well known in the art. The stages 4 and 6 may have, as the active elements thereof, transistors or vacuum tubes and may assume various configurations as this portion of the receiver does not form any part of my invention. A primary winding 8 of an intermediate frequency signal transformer 10 receives the output of I.F. stage 6 and couples to a secondary 12 of the same transformer.

In accordance with my invention, when utilized in a device of the character illustrated in the drawing, I provide a battery source 14 of electrical energy. It is obvious that any unidirectional source may be used, but as the description of the invention proceeds, it will be seen that the circuit has particular advantages when used in a battery powered application. The negative terminal of the battery is connected to a junction 16 in the receiver circuit, while the positive terminal may be connected to the chassis supporting the unit as a ground or return path for current flow from points in the receiver. A dropping resistor 18 couples the battery source 16, so that junction 20 in this embodiment is less negative than junction 16, to a first semiconductor device such as the transistor 22. In order to provide an operating bias for the transistor 22, a voltage divider network 24 and 26 couples its base 28 to emitter 30. The collector 32 of transistor 22 is connected to the sliding or otherwise moveable tap 34 of a potentiometer 36. A bypass capacitor 38 is provided to shunt alternating signals of intermediate frequency to ground. The circuit includes a second transistor 39 which is complementary to transistor 22. That is, if the first transistor 22 is of the junction type of NPN variety as shown, then the second transistor is also of the junction type and of the PNP variety so that signals of opposite sign will cause conduction in each transistor. A load device such as a loudspeaker 46 receives the output of the transistor 39 through an audio transformer 48.

In the embodiment illustrated, a detecting or demodulation device such as the crystal diode 50 is connected in series between the secondary 12 of the I.F. transformer 10 and base 28 of transistor 22 to provide an audio signal for amplification by the transistors 22 and 39. However, in another form of my invention, as shown in Fig. 2, the diode 50 is eliminated and the transistor 22, when suitably biased by the voltage-divider resistors 24 and 26, functions as a combination detector-driver.

The types of transistors used may also be varied, as for example, in the illustrated circuits the transistor 22 could be of the PNP type and transistor 39 of the NPN type. If the types of the transistors are changed in this manner in the circuit of Fig. 1, then the diode 50 must be reversed in polarity.

In the operation of my invention, when there is no I.F. signal applied, there is negligible emitter bias on the transistor 39, since base 40 and emitter 42 are at the same potential and the current flow therein is negligible. Similarly, the current flow in the transistor 22 is small, since there is a low emitter bias therein. Upon the application of an I.F. signal to the transformer 10 in the circuit of Fig. 1, the diode 50 conducts and rectifies the signal, and a positive going signal is applied to base 28 of transistor 22 to cause a collector current to flow therein. In the circuit of Fig. 2, the transistor 22 is conductive for a given polarity of the I.F. signal, thereby rectifying the signal and causing increased collector current to flow therein. This current is through at least a portion of the resistor 36 when this resistor is adjusted for signal reception, and develops a negative direct current potential in this resistor and therefore at base 40 of transistor 39. The negative potential causes collector current to flow in transistor 39 and the desired audio amplification is thereby obtained. The negative D.C. potential developed at transistor base 40 is, of course, directly proporotioned to the strength of the received signal and the setting of the volume control slider 34. Therefore, it is possible in an area of strong signals to set the slider 34 near the bottom of the resistor 36 (as illustrated in the drawing) and still develop sufficient negative D.C. to produce the desired amplification. When greater amplification is desired, as in an area of weak signals, the slider 34 can be set at or near the top of resistor 36 to reduce the value of the resistance in the signal path and still obtain desired amplification of the audio signals. Thus, at any time, a reduction of the volume results in less collector current in transistor 39 and therefore less drain on battery 16.

The values of the circuit components can be selected so that the negative D.C. on base 40 is of such a level as to open transistor 39 to a point where it accommodates the maximum audio signal to be amplified.

While I have shown a particular embodiment of my invention, it will, of course, be understood that I do not wish to be limited thereto since various modifications may be made by those skilled in the art without departing from the invention. I, therefore, aim in the appended claims to cover all such equivalent variations as come within the true spirit and scope of my invention.

What I claim as new and desire to secure by Letters Patent of the United States is:

1. In an amplifier for broadcast receivers or the like, an alternating input signal source, a first transistor including a base to which the input signal is applied, an emitter and a collector, a low voltage D.-C. power supply of limited energy capacity, impedance means in circuit with said power supply to bias the emitter of said first transistor with respect to the base so that said first transistor is in an essentially non-conducting condition through its collector in the absence of an applied signal, a coupling circuit including a variably tapped connection to a resistor from the output of the collector of said first transistor, a second transistor having a base connected by direct-current conductive means to one end of said tapped resistor, a collector connected to an output circuit, and an emitter, said emitter and the opposite end of said tapped resistor being connected to said power supply at a polarity biasing said second transistor to cutoff condition until a signal current is applied through said variably tapped connection, whereby power supply drain through said second transistor under no signal conditions is prevented.

2. The combination of claim 1 wherein said variably tapped resistor operates as the volume control of an audio amplifier.

3. The combination of claim 1 wherein said second transistor is in a power output stage of an audio amplifier and said output circuit comprises a loud-speaker.

4. The combination of claim 1 wherein said first transistor functions as a detector and wherein said coupling circuit includes means to by-pass the high frequency components to ground.

5. The combination of claim 1 wherein said first and second transistors are complementary.

6. An amplifier circuit for radio receivers or the like, comprising a first transistor having base, emitter and collector electrodes, a resistive element connected between said collector and a source of operating voltage, means connected to bias said base with respect to said emitter so that relatively little collector current will flow in the absence of an input signal, a second transistor having base, emitter and collector electrodes, direct-current conductive means connecting the base of said second transistor to said resistive element, output circuit means connecting the collector of said second transistor to a source of operating voltage, means connected to bias the emitter of said second transistor with respect to the base thereof so that relatively little collector current will flow therein in the absence of an input signal, and means for applying a modulated input signal to the base of the first transistor whereby the signal is rectified thereby providing in said resistive element a demodulated signal and also a D.C. voltage which changes the base bias of said second transistor to cause the collector current therein to increase sufficiently so that said second transistor will amplify said demodulated signal.

7. An amplifier circuit as claimed in claim 6 in which said resistive element comprises a potentiometer having an adjustable tap, said tap being connected to the collector of said first transistor, one end of said potentiometer being connected to the base of said second transistor, and the other end of said potentiometer being connected to said first-mentioned source of operating voltage.

8. An amplifier circuit as claimed in claim 7, including a capacitor connected between the tap and said other end of said potentiometer and having a value to bypass the carrier frequency of said input signal.

9. A signal amplification circuit for battery powered broadcast receivers, comprising a battery, a first transistor having base, emitter and collector electrodes, means for rectifying a modulated radio signal in said receiver, means connected to apply the rectified signal to the base of said first transistor, means applying operating potentials derived from said battery to the emitter and base electrodes, respectively, of said first transistor with relative values to bias said first transistor to a non-conducting condition in the absence of a received signal, a second transistor complementary to said first transistor and having base, emitter and collector electrodes, means connecting the emitter electrode of said second transistor to a point on said battery, a resistance connected between a point on said battery and the base of said second transistor to apply to said base of the second transistor a voltage causing cut-off of said second transistor when no signal is being received, a moveable tap on said resistance, a bypass capacitor connected from said moveable tap to the end of said resistance that is connected to the battery, means connecting the collector electrode of said first transistor to said moveable tap, and means including a load device connecting the collector of said second transistor to a point on said battery.

References Cited in the file of this patent

UNITED STATES PATENTS

| | | |
|---|---|---|
| 2,199,169 | Dome | Apr. 30, 1940 |
| 2,789,164 | Stanley | Apr. 16, 1957 |
| 2,891,146 | Scruba | June 16, 1959 |

FOREIGN PATENTS

| | | |
|---|---|---|
| 652,959 | Great Britain | May 2, 1951 |

OTHER REFERENCES

Transistor Circuit Handbook, published by Coyne Electrical School, July 1956.

A Study of Transistor Circuits for Television, Proc. IRE, June 1953, pages 708–717.

Transistor Electronics, Sept. 26, 1955, pages 185–186.

Transistor Radios by Kiver Radio & Television News, May 1956, pages 68, 69 and 131.

UNITED STATES PATENT OFFICE

CERTIFICATE OF CORRECTION

Patent No. 2,984,742 May 16, 1961

Joseph A. Worcester

It is hereby certified that error appears in the above numbered patent requiring correction and that the said Letters Patent should read as corrected below.

In the grant, lines 2 and 3 and in the heading to the printed specification, line 5, for "a corporation of Delaware", each occurrence, read -- a corporation of New York --.

Signed and sealed this 5th day of December 1961.

(SEAL)
Attest:

ERNEST W. SWIDER
Attesting Officer

DAVID L. LADD
Commissioner of Patents

USCOMM-DC